United States Patent [19]

Muir

[11] Patent Number: 4,919,408
[45] Date of Patent: Apr. 24, 1990

[54] CRANKSHAFT STAND

[76] Inventor: Dennis M. Muir, 150 John St., Monterey, Calif. 93940

[21] Appl. No.: 330,500

[22] Filed: Mar. 30, 1989

[51] Int. Cl.⁵ .............................................. B66F 5/04
[52] U.S. Cl. ..................................... 269/296; 269/902
[58] Field of Search ..................... 269/45, 43, 76, 296, 269/299, 902; 254/2 B, 134; 248/172, 149, 670, 676

[56] References Cited

U.S. PATENT DOCUMENTS

| | | | |
|---|---|---|---|
| 568,543 | 9/1896 | Parks | 269/902 |
| 1,798,340 | 3/1931 | Thewes | 269/296 |
| 2,638,676 | 5/1953 | Callahan | 269/45 |
| 2,669,424 | 2/1954 | Branick | 254/134 |
| 2,676,784 | 4/1954 | Howard | 254/17 |
| 2,699,601 | 1/1955 | Darnell | 269/296 |
| 2,709,384 | 5/1955 | Harris | 269/296 |
| 3,207,504 | 9/1965 | Kelley et al. | 269/296 |
| 4,383,681 | 5/1983 | Walters | 269/296 |

Primary Examiner—Robert C. Watson
Attorney, Agent, or Firm—Janet K. Castaneda

[57] ABSTRACT

A frame for supporting a crankshaft has two supports with depressions for holding the shaft of a crankshaft to permit rotation of the shaft. The supports are placed in a frame that has two arms with brackets that hold the supports against the arms. The arms are connected parallel to each other by a connecting bar that may be adjustable in length. The connecting bar may be telescoped for adjustment and provided with a locking device, such as a threaded screw and nut. In a second embodiment, the arms are connected by a plate.

4 Claims, 2 Drawing Sheets

CRANKSHAFT STAND

FIELD OF THE INVENTION

The present invention relates to a stand for supporting a crankshaft. More particularly, the present invention relates to an internal combustion engine crankshaft stand.

BACKGROUND OF THE INVENTION

Crankshafts have a central shaft with one or more rotatable cranks for translating motion within a motor, such as a pitston driven internal combustion engine, for example. Mechanics routinely remove crankshafts from motors to inspect, clean, and measure them; and, to perform machine operations, such as turning, balancing, drilling and welding. Free rotation of the shaft to expose all of the rotatable cranks is desirable to perform most crankshaft operations. It is also necessary to store crankshafts that have been removed from motors for repair or inspection.

Automotive and other crankshafts used for sizable motors may weigh approximately forty to one hundred pounds which makes them somewhat unwieldy to work upon. Mechanics frequently work on large crankshafts by placing them on flat surfaces and then physically wrestling them into the desired position to perform the needed work. Measuring may require that the shaft be stood up upon one end.

Several devices have been employed to support crankshafts. The V-Block, as in U.S. Pat. No. 4,445,678, is an expensive precision tool designed to be attached to a milling table to perform precision milling operations on a crankshaft. V-blocks are complicated, expensive devices that contain mechanisms such as key lugs for precision alignment and realignment of the block in relation to milling tables. An ordinary mechanic may not possess a V-block. In any event, an expensive, precision tool is insufficiently ruggedized to be used for crankshaft support for routine mechanical operations.

The crankshaft stand in expired U.S. Pat. No. 1,363,478 is a cumbersome device that consists of two pieces that must be assembled from collapsed storage configurations prior to use. Each of the two pieces cannot stand alone and each piece must be attached to a work bench with a clamp.

Another two part crankstand device used for drilling operations has feet designed to straddle an aluminum channel. One foot is longer than the other in an attempt to increase support. The device is large, costly and unstable.

As can be seen from the above summary of the prior art, an unsolved need exists for an inexpensive, assembled, compact and stable device for supporting crankshafts for routine mechanical operations.

SUMMARY OF THE INVENTION WITH OBJECTS

A general object of the invention is to provide an apparatus for supporting a shaft that overcomes the limitations and drawbacks of the prior art.

A specific object of the invention is to provide a low cost and stable device to supporting a crankshaft.

Another specific object of the invention is to provide a small, adjustable stand to support a variety of crankshafts for routine mechanical operations.

Yet one more object of the present invention is to provide an inexpensive, compact and stable, adjustable stand to support an internal combustion engine crankshaft for routine mechanical operations.

In accordance with the present invention, the shaft portion of the crankshaft is supported in two places by V-shaped notches formed in two end support blocks that are connected by an adjustable bar or by a plate. The V-shaped support allows the mechanic to rotate the shaft. The adjustable connecting bar allows accommodation of crankshafts of different lengths; and, a locking device is provided to secure the selected connecting bar length.

These and other objects, aspects, advantages and features of the present invention will be more fully understood and appreciated upon consideration of the following detailed description of preferred embodiments, presented in conjunction with the accompanying drawings.

DETAILED DESCRIPTION OF THE PREFERRED EMBODIMENTS

Figure 1:
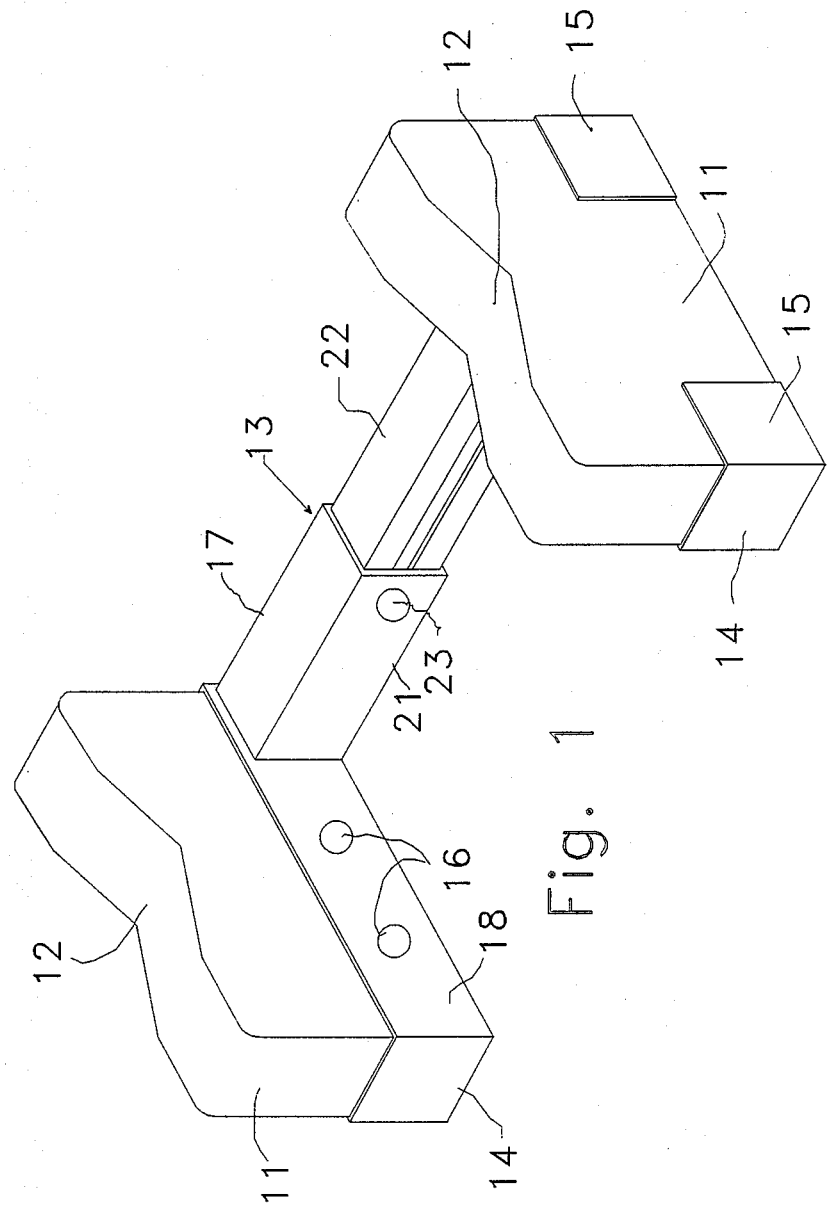
FIG. 1 is a perspective view of a crankshaft stand incorporation the principles of the present invention.

With reference to FIG. 1, an embodiment of the crank shaft stand is shown generally at 10. The stand is assembled from two elements: end support blocks 11 and frame 13. Frame 13 is constructed from sheet metal and contains adjustable connecting bar 17 and two arms 18 welded to the ends of connecting bar 17. Arms 18 are mounted perpendicular to support bar 17 and parallel to each other. Frame 13 forms an approximately rectangular structure with one open long side. End support blocks 11 are roughly rectangular and each is provided with a V-shaped notch 12 cut into one long side of the rectangle for supporting the shaft of a crankshaft (not shown). Notches 12 permit full rotation of the shaft of the crankshaft. The straight long side of each support block 11 is inserted into and held by arm 18 to complete the crankshaft stand. Support blocks 11 may be removed from frame 13 and are preferably made of a hard wood.

Both ends of each arm 18 define L-shaped brackets 14 with extensions 15 to securely hold support blocks 11 against arm 18 and within frame 13. Extensions 15 also prevent support blocks 11 from falling out of frame 13 in the event that support blocks 15 should split or break.

Four threaded screw holes 16 may be drilled into frame 13 to provide further stability of crankshaft stand 10 by attaching support blocks 11 to arms 18 with screws (not shown).

Adjustment of the spacing between arms 18 is provided by connecting bar 17 which is a telescoped bar having a slidably engaged outer tube 21 and an inner tube 22. Inner tube 22 defines a transverse slot 24 throughout its length.

Locking device 23 is a threaded bolt that extends through an opening in outer bar 21 and passes through slot 24 to engage with a threaded nut to clamp tubes 21 and 22. Positional locking is achieved through frictional engagement of the nut on the end of the bolt with inner tube 22.

While FIG. 1 shows connecting bar 17 in a square configuration, it will be appreciated by those skilled in the art that circular pipe could be used to form the connecting piece. The connecting piece may also be located at any point along arms 18, including centrally located. Locking on the position of the telescoped bar may also be accomplished through the use of a pin through the outer tube 21 designed to fit into multiple pin holes drilled along the length of the inner tube 22. Notches 12 may also assume other shapes such as rounded or squared openings to secure the shaft of the crankshaft in the stand 10 and still permit rotation of the shaft. It will also be recognized by those skilled in the art that the materials of the crankshaft stand may vary. The support blocks and/or frame may be constructed from metal, wood, rubber, or plastic materials.

Figure 2:
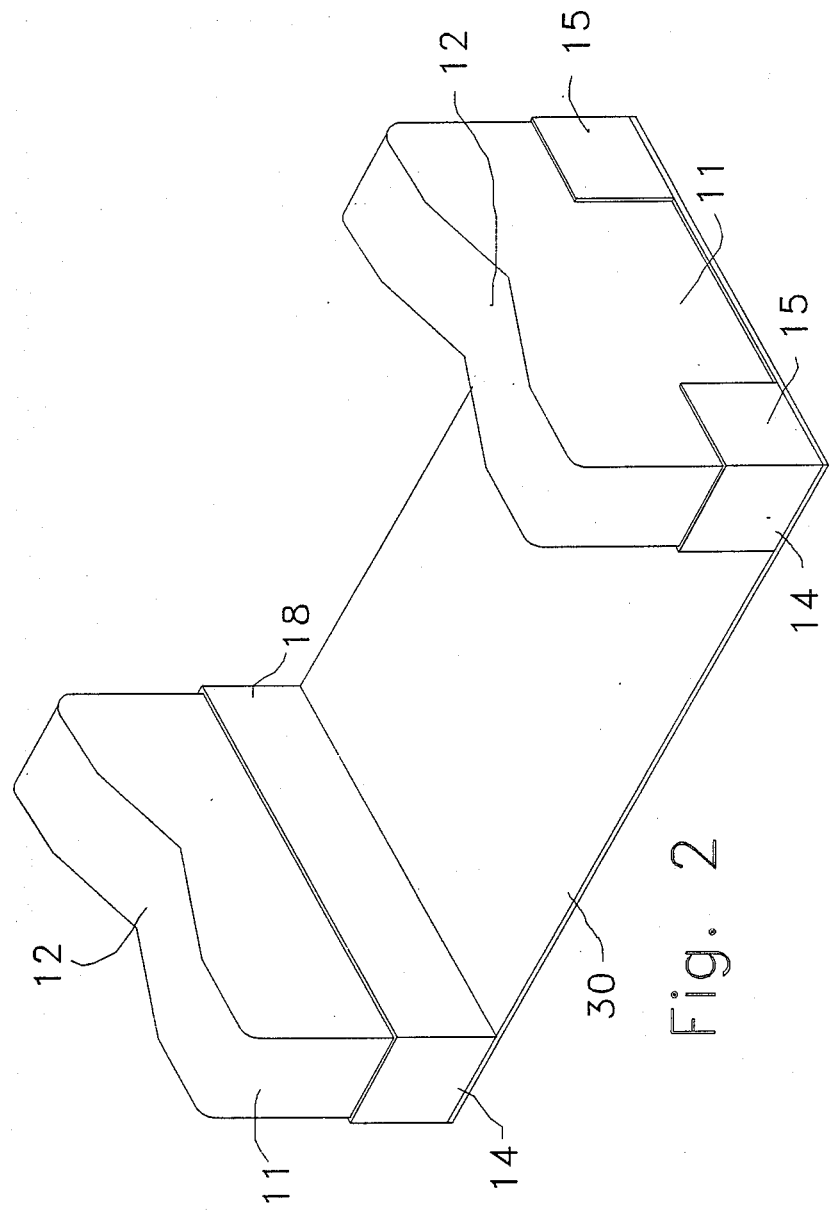
FIG. 2 is a perspective view of a second embodiment of the present invention.

Another embodiment of a crankshaft stand is shown in FIG. 2. In this second embodiment, connecting bar 17 has been replaced with metal sheet 30 which is welded to arms 18. The FIG. 2 embodiment is not adjustable.

While both embodiments of the crankshaft stand are particularly adapted to hold internal combustion engine crankshafts, smaller and larger crankshafts are accommodated by the adjustable connecting bar; and, both smaller and larger versions of the crankshaft stand are appropriate in view of the basic design.

To those skilled in the art to which the present invention pertains, many widely varying embodiments and implementations of the principles of the present invention will be suggested from the foregoing. The description and the disclosures presented herein are by way of illustration only and should not be considered to limit the present invention, the scope of which is more particularly set forth in the following claims.

I claim:

1. An adjustable stand for supporting a crankshaft, comprising:
    two equal supports, each support having a V-shaped notch for supporting a region of the shaft of a crankshaft, the V-shaped notch permitting free rotation of the shaft while resting in the notch;
    an adjustable frame, the frame defining two arms connected by a perpendicularly mounted connecting bar disposed between and at the ends of the two arms, the connecting bar being of adjustable length to permit alteration of the distance between the two arms;
    each of the two arms defining two ends having brackets for holding a support against the arm, each bracket having an extension to prevent the support from falling out of the frame arm, each arm further having at least one hole for receiving a screw to further connect the support to the frame arm;
    the connecting bar defining a telescoped inner bar disposed within an outer bar, the inner bar having a longitudinally disposed slot; and
    a threaded screw and nut for securing the positions of the inner and outer bars, the screw fitting through a threaded opening in the outer bar and passing through the slot in the inner bar, the nut frictionally engaging with the inner bar.

2. An adjustable stand for supporting a crankshaft, comprising:
    two equal supports, each support having a V-shaped notch for supporting a region of the shaft of a crankshaft, the V-shaped notch permitting free rotation of the shaft while resting in the notch;
    an adjustable frame, the frame defining two arms connected by a perpendicularly mounted connecting bar disposed between and at the ends of the two arms;
    each of the two arms defining two ends having brackets for holding a support against the arm, each bracket having an extension to prevent the support from falling out of the frame arm; and
    the connecting bar defining a telescoped inner bar disposed within an outer bar, the connecting bar being of adjustable length to permit alteration of the distance between the two arms, the connecting bar further defining locking means to secure a selected length of the connecting bar.

3. The stand as set forth in claim 2 wherein the locking means comprises a screw and nut, the screw being threaded through a hole in the outer tube and passing through a longitudinal slot in the inner tube, the nut frictionally engaging the inner tube.

4. The stand as set forth in claim 2 wherein the locking means comprises a pin, the pin fitting through a hole in the outer tube and engaging within one of a plurality of holes spaced along the lenght of the inner tube.

* * * * *